(12) United States Patent
Aizawa et al.

(10) Patent No.: US 7,666,948 B2
(45) Date of Patent: Feb. 23, 2010

(54) ELASTOMER COMPOSITION AND MOLDED BODY

(75) Inventors: Seiji Aizawa, Hamamatsu (JP); Tomoya Shimizu, Hamamatsu (JP); Naoya Kuzawa, Hamamatsu (JP); Hiroshi Saito, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 381 days.

(21) Appl. No.: 11/317,257

(22) Filed: Dec. 27, 2005

(65) Prior Publication Data

US 2006/0148991 A1 Jul. 6, 2006

(30) Foreign Application Priority Data

Dec. 28, 2004 (JP) .................... P. 2004-378969
Nov. 15, 2005 (JP) .................... P. 2005-330112

(51) Int. Cl.
*C08L 33/02* (2006.01)

(52) U.S. Cl. .................... 525/199; 525/479
(58) Field of Classification Search .......... 525/199, 525/479

See application file for complete search history.

(56) References Cited

U.S. PATENT DOCUMENTS

| 4,948,830 | A | * | 8/1990 | Martin et al. ............ 524/462 |
| 5,006,594 | A | * | 4/1991 | Rees .................... 524/520 |
| 5,459,202 | A | | 10/1995 | Martinez et al. |
| 5,548,028 | A | | 8/1996 | Tabb |
| 6,321,062 | B1 | | 11/2001 | Kitano et al. |
| 2002/0099142 | A1 | | 7/2002 | Faulkner |
| 2003/0004273 | A1 | | 1/2003 | Apostolo et al. |

FOREIGN PATENT DOCUMENTS

| EP | 0 437 806 A2 | 7/1991 |
| EP | 0 439 734 A1 | 8/1991 |
| EP | 0 656 391 A2 | 6/1995 |
| EP | 1 260 550 A1 | 11/2002 |
| JP | 2000-44930 | 2/2000 |
| JP | 2000-119468 | 4/2000 |
| JP | 2000-321912 | 11/2000 |
| WO | WO 93/22379 | 11/1993 |

OTHER PUBLICATIONS

DuPont Performance Elastomers, "Perfluoroelastomer and Fluoroelastomer Seals for Photovoltaic Cell Manufacturing Processes", Technical Information, Paper Presented at InterSolar SMET, May 2009.

* cited by examiner

*Primary Examiner*—Kuo-Liang Peng
(74) *Attorney, Agent, or Firm*—Nixon & Vanderhye P.C.

(57) ABSTRACT

The present invention provides an elastomer composition comprising a mixture of (A) a perfluoroelastomer and (B) at least one elastomer selected from fluorine rubbers, silicone rubbers and ethylene-propylene based rubbers, in a mixing ratio (A/B) of from 0.5/99.5 to 80/20 in terms of weight ratio.

4 Claims, 2 Drawing Sheets

2μm

2μm

2μm

2μm

ELASTOMER COMPOSITION AND MOLDED BODY

FIELD OF THE INVENTION

The present invention relates to a molded body to be used in sites which are required to have plasma resistance, chemical resistance, heat resistance, and the like. The invention further relates to an elastomer composition for molding the molded body.

BACKGROUND OF THE INVENTION

Molded bodies of a seal material to be used in devices which are used under circumstances such as a plasma atmosphere and a chemical atmosphere are required to have high stability against various chemical species, and molded bodies made of a fluorine based elastomer are chiefly employed (see, for example, Patent Document 1). In these devices, in recent years, gases, chemical liquids, and the like with high concentration and high chemical reactivity have been used for the purposes of improving efficiency, etc. However, in molded bodies made of a fluorine based elastomer which have hitherto been widely used, there is encountered such a problem that deterioration is so vigorous that they are no longer useful.

Of fluorine based elastomers, since perfluoroelastomers exhibit especially excellent plasma resistance and chemical resistance, they are frequently used in devices to be used under the foregoing severe circumstances (see, for example, Patent Document 2). However, the perfluoroelastomers are low in hot strength so that there is some possibility that inconveniences such as cutting of an O-ring molded body during the high-temperature treatment are generated.

Patent Document 1: JP-A-2000-119468
Patent Document 2: JP-A-2000-044930

SUMMARY OF THE INVENTION

In view of the foregoing circumstances, the invention has been made.

An object of the invention is to provide a molded body having not only excellent plasma resistance and chemical resistance but also heat resistance and sufficient mechanical strength.

Another object of the invention is to provide an elastomer composition for molding the molded body.

In order to solve the above-described problems, the present inventors made extensive investigations. As a result, it has been found that by mixing (A) a perfluoro-elastomer and (B) at least one elastomer selected from fluorine rubbers, silicone rubbers and ethylene-propylene based rubbers in a certain ratio, a molded body having not only excellent plasma resistance and chemical resistance but also heat resistance and mechanical strength can be obtained.

Specifically, the invention is concerned with the following elastomer compositions and molded bodies.

(1) An elastomer composition comprising a mixture of (A) a perfluoroelastomer and (B) at least one elastomer selected from fluorine rubbers, silicone rubbers and ethylene-propylene based rubbers, in a mixing ratio (A/B) of from 0.5/99.5 to 80/20 in terms of weight ratio.

(2) The elastomer composition as set forth above in (1), wherein the mixing ratio (A/B) of the perfluoroelastomer (A) to the elastomer (B) is from 5/95 to 60/40 in terms of weight ratio.

(3) The elastomer composition as set forth above in (1) or (2), further containing an organic peroxide and a co-crosslinking agent for crosslinking each of the perfluoroelastomer (A) and the elastomer (B) or crosslinking the former with the latter.

(4) The elastomer composition as set forth above in any one of (1) to (3), wherein the perfluoroelastomer (A) and the elastomer (B) lie compatible with each other or form a sea-island structure in which one of the components (A) and (B) is dispersed as an aggregate having an average particle size of not more than 10 μm in the other component.

(5) A molded body produced by molding the elastomer composition as set forth above in any one of (1) to (4).

(6) The molded body set forth above in (5), wherein the perfluoroelastomer (A) and the elastomer (B) lie compatible with each other or form a sea-island structure in which one of the components (A) and (B) is dispersed as an aggregate having an average particle size of not more than 10 μm in the other component.

According to the invention, a molded body having not only excellent plasma resistance and chemical resistance but also heat resistance and mechanical strength can be obtained. The molded body is especially useful as a seal material of a device for manufacturing a semiconductor to be exposed to plasma, chemicals, and so on.

DETAILED DESCRIPTION OF THE INVENTION

Figure 1:
FIG. 1 is a TEM photograph showing the state that non-continuous phases of both components are dispersed in the elastomer composition of the invention.

The invention will be described in detail below.

In the invention, the perfluoroelastomer (A) is not particularly limited. However, perfluoroelastomers containing copolymerization units of: a perfluoroolefin; a perfluorovinyl ether selected from the group consisting of a perfluoro(alkylvinyl) ether, a perfluoro(alkoxyvinyl) ether and a mixture thereof; and a curing site monomer are preferable, and ones which are crosslinkable with an organic peroxide are further desired. Examples of the perfluoroelastomer (A) include DAI-EL GA-05, manufactured by Daikin Industries, Ltd.

In the invention, the elastomer (B) is selected from fluorine rubbers, silicone rubbers and ethylene-propylene based rubbers, each of which may be used singly or in admixture. Furthermore, the elastomer (B) is desirably one which is crosslinkable with an organic peroxide.

Although the fluorine rubber is not particularly limited, a fluorine rubber which is crosslinkable with an organic peroxide is desired from the viewpoint of mechanical strength of a molded body. Examples thereof include vinylidene fluoride/hexafluoropropene based copolymers, vinylidene fluoride/hexafluoropropene/tetrafluoroethylene based co-polymers, and tetrafluoroethylene/propylene based copolymers. Copolymers resulting from additional copolymerization of the foregoing copolymer with ethylene, a perfluoroalkylvinyl ether, or the like are also useful. Fluorine based thermoplastic elastomers which are block copolymers of a fluorine rubber (for example, vinylidene fluoride/hexafluoropropene/tetrafluoroethylene based copolymers) and a fluorine resin (for example, tetrafluoroethylene/ethylene alternating copolymers and polyvinylidene fluoride) are also useful. Also, mixtures of two or more of the foregoing fluorine rubbers may be used.

Although the silicone rubber is not particularly limited, a silicone rubber which is crosslinkable with an organic peroxide is desired from the viewpoint of mechanical strength of a molded body. For example, methyl vinyl silicone rubbers, methyl vinyl phenyl silicone rubbers, and fluorosilicone rubbers are suitable. Mixtures of two or more of the foregoing silicone rubbers may be used.

The ethylene-propylene based rubber is a rubber mainly comprising a copolymer of ethylene and propylene, and conventionally known materials can be widely used. The ethylene content of the ethylene-propylene based rubber is preferably 50 to 70% by weight. The ethylene-propylene based rubber may contain a small amount of a diene component. As the diene component, dichloropentadiene, ethylidene norbornene, 1,4-hexadiene, and the like are preferable. Mixtures of two or more of the ethylene-propylene based rubbers may be used. The ethylene-propylene based rubber may be a commercial product. For example, Keltan 8340A (EPDM rubber manufactured by DSM) and the like are available from the market.

As the organic peroxide crosslinking agent, known materials for crosslinking of a fluorine based elastomer can be used. Examples thereof include dicumyl peroxide, di-t-butylperoxydiisopropylbenzene, and 2,5-dimethyl-2,5-di(t-butylperoxy)hexane.

As the co-crosslinking agent, known materials for crosslinking of a fluorine based elastomer can be used. Examples thereof include triallyl isocyanurate, triallyl cyanurate, triallyl trimellitate, N,N'-m-phenylene dimaleimide, and trimethylolpropane trimethacrylate. Besides, acrylate based monomers, methacrylate based monomers, and the like can also be used.

The mixing ratio of the perfluoroelastomer (A) to the elastomer (B) is from 0.5/99.5 to 80/20, and preferably from 5/95 to 60/40 in terms of weight ratio. When the mixing ratio falls outside this range, the desired object cannot be attained.

The elastomer composition of the invention can be produced by various common methods. For example, the perfluoroelastomer (A), the elastomer (B), the organic peroxide crosslinking agent, and the co-crosslinking agent may be mixed by an open roll, a kneader, a Banbury mixer, a twin-screw extruder, etc., but it should not be construed that the invention is limited thereto.

With respect to the resulting elastomer composition, it is desirable that the perfluoroelastomer (A) and the elastomer (B) lie compatible with each other. However, a "sea-island structure" in which one of the components (A) and (B) is dispersed as a substantially spherical aggregate in the other component may possibly be formed depending upon the mixing ratio of the both components and mixing conditions (for example, the shape and size of a rotor of a mixing device and the mixing time). Furthermore, even when a complete sea-island structure is not formed, there may be a case where a state that amorphous non-continuous phases of the respective components are mutually tangled and dispersed, as shown in FIG. 1 is formed. In the present invention, so far as the aggregate or the non-continuous phases are fine, any of the foregoing dispersion states is acceptable. Above all, preferred is a sea-island structure having a size of the aggregate (island) of not more than 10 µm, more preferably not more than 2 µm in terms of average particle size.

The molded body of the invention can be obtained by subjecting the elastomer composition to crosslinking. The crosslinking can be performed in accordance with a molding method by usual crosslinking with a peroxide. In general, a prescribed amount of the elastomer composition is charged in a die having a desired shape and then heat-pressed. As needed, secondary crosslinking may be carried out at from 150° C. to 250° C. for from 1 to 32 hours in an oven. The shape of the molded body is not particularly limited, and arbitrary shapes such as a sheet-like shape, a rod-like shape, a ring-like shape, and various complicated block shapes may be employed depending upon the utilization.

As is clear from the Examples as described later, the molded body of the invention is excellent in various characteristics such as plasma resistance, chemical resistance, low staining properties, mechanical strength, and tensile strength and elongation especially at high temperatures with good balance. It is thought that this is caused due to tension and elongation by the elastomer (B) added to the plasma resistance, chemical resistance and low staining properties originally possessed by the perfluoroelastomer (A). Such characteristics become the best in a state that the perfluoroelastomer (A) and the elastomer (B) are uniformly mixed. Also in the molded body, the same dispersion state as in the elastomer composition is acceptable. However, it is preferable that the molded body is of a sea-island structure made of an aggregate preferably having an average particle size of not more than 10 µm, and more preferably not more than 2 µm. Incidentally, with respect to the sizes of the aggregate and the non-continuous phases in the dispersion state, the respective sizes in the elastomer composition are substantially held as they are to serve as the dispersion state in the molded body.

For the reason that the molded body of the invention has the foregoing characteristics, it is suitable for use under severe circumstances such as high temperature and vacuum. For example, the molded body of the invention is useful as a seal material of a device for manufacturing a semiconductor to be exposed to plasma, chemicals, and so on. Incidentally, the kind of a plasma gas does not matter, and for example, in plasma processing devices, $O_2$, $CF_4$, $O_2+CF_4$, $H_2$, $CHF_3$, $CH_3F$, $CH_2F_2$, $Cl_2$, $C_2F_6$, $BCl_3$, $NF_3$, $NH_3$, and the like are general. The molded body of the invention has excellent resistance to any plasma. Accordingly, the invention is not against specific plasma.

EXAMPLES

The present invention will be illustrated in greater detail with reference to the following Examples, but the invention should not be construed as being limited thereto.

Examples 1 to 5 and Comparative Examples 1 to 6

As shown in Tables 1 and 2, a perfluoroelastomer (A), an elastomer (B), a crosslinking agent, and a co-crosslinking agent are mixed by using an open roll. Incidentally, in Example 2 and Comparative Example 3, the size of an aggregate was adjusted by changing the mixing time. The resulting compound was set in a die, subjected to crosslinking molding at a die temperature of 160° C. for 10 minutes, and then subjected to secondary crosslinking for 4 hours in an oven at 180° C., thereby obtaining a sheet. A specimen was cut out from the resulting sheet and subjected to the following evaluations. The results obtained are also shown in Tables 1 and 2.

(1) Evaluation of Ordinary Temperature Characteristic:
Tensile strength and elongation at break:
The evaluation was carried out according to JIS K6251.

(2) Evaluation of Hot Characteristic at 100° C.:
Tensile strength and elongation at break:
The evaluation was carried out according to JIS K6251, except for setting up the test atmosphere at 100° C.

(3) Evaluation of Plasma Resistance:
The specimen was exposed to plasma under the following conditions, and the plasma resistance was evaluated in terms of rate of loss in weight of the specimen before and after the exposure.
Device: Surface wave plasma etching system, manufactured by Shinko Seiki Co., Ltd.
Specimen: Sheet of 2 mm in thickness and 13 mm in diameter
Gas: $O_2+CF_4$
Processing pressure: 133 Pa
Output: 3 kW
Exposure time: 2 hours
Rate of loss in weight (weight %)={[(Weight before the exposure to plasma)−(Weight immediately after the exposure to plasma)]/(Weight before the exposure to plasma)}×100

Figure 2:
FIG. 2 is a TEM photograph of the sheet as prepared in Example 2.
Figure 3:
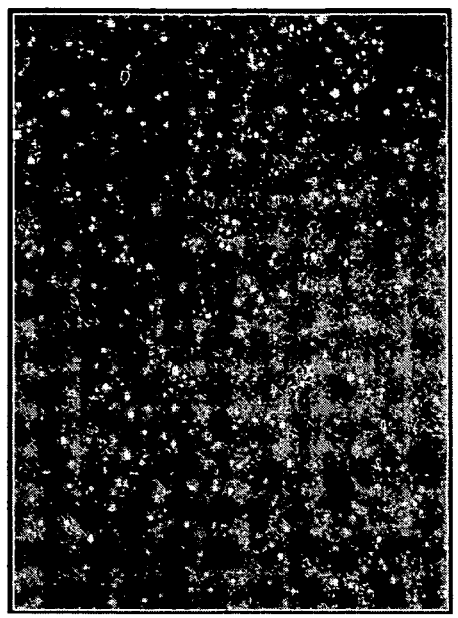
FIG. 3 is a TEM photograph of the sheet as prepared in Example 3.
Figure 4:
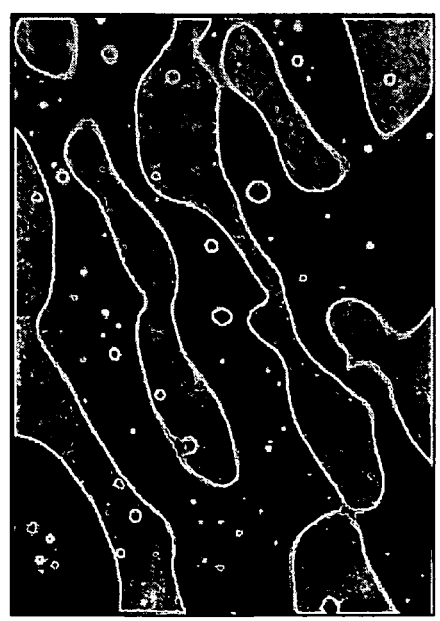
FIG. 4 is a TEM photograph of the sheet as prepared in Comparative Example 3.

(4) Method for Measuring Average Particle Size of Aggregate:
A thin slice was collected from the specimen, from which was then taken a transmission electrophotograph by using a transmission electron microscope (JEM-2000X, manufactured by JEOL Ltd.). In the photograph, an average area of an aggregate (particulate material) was measured, and on the assumption that this average area was a circle, its diameter was determined and defined as an average particle size. Furthermore, TEM photographs of the sheets as prepared in Example 2, Example 3 and Comparative Example 3 are shown in FIGS. 2 to 4, respectively.

Examples 1 to 3 and Comparative Examples 1 to 4 as shown in Table 1 verify mixed systems of a perfluoroelastomer and a fluorine rubber. With respect to the rate of loss in weight by the exposure to plasma, it is noted that as shown in Example 1, the molded body according to the invention thoroughly keeps the performance of the perfluoroelastomer of Comparative Example 1. Furthermore, even in the case where the compounding ratio of the perfluoroelastomer is low as in the molded bodies as shown in Examples 2 and 3, excellent plasma resistance is revealed as compared with the molded body made of the fluorine rubber alone of Comparative Example 4. On the other hand, with respect to the molded body of Comparative Example 2 in which the compounding ratio of the perfluoroelastomer is lower than the range of the invention and the molded body of Comparative Example 3 in which the average particle size of the aggregate is large, an effect which is brought by mixing with the perfluoroelastomer is limitative.

Furthermore, the molded bodies of Examples 1 to 3 have an ordinary temperature mechanical strength equal to or higher than that of the molded bodies of Comparative Example 1 and Comparative Example 4. In addition, the perfluoroelastomer molded body of Comparative Example 1 is deteriorated in hot strength, whereas the molded bodies of Examples 1 to 3 have a strength equal to or higher than that of the molded body made of the fluorine rubber alone according to Comparative Example 4 which is excellent in hot strength.

Examples 4 to 5 and Comparative Examples 5 to 6 as shown in Table 2 verify mixed systems of a perfluoroelastomer with a silicone rubber or an ethylene-propylene based rubber. With respect to the rate of loss in weight by the exposure to plasma, the molded bodies of Examples 4 and 5 according to the invention exhibit excellent plasma resistance as compared with the molded body made of the silicone rubber alone according to Comparative Example 5 and the molded body made of the ethylene-propylene based rubber alone according to Comparative Example 6. Furthermore, the elastomer molded bodies of Examples 4 and 5 have a strength equal to or higher than that of the molded bodies of Comparative Examples 1, 5 and 6.

In the light of the above, it was confirmed that in accordance with the invention, even in the case where a molded body is made of an elastomer composition containing a mixture of (A) a perfluoroelastomer and (B) at least one elastomer selected from fluorine rubbers, silicone rubbers and ethylene-propylene based rubbers in a specified mixing ratio and having an aggregate dispersed therein, a molded body having an average particle size of not more than 10 μm is excellent in plasma resistance, chemical resistance, heat resistance and mechanical strength with good balance.

TABLE 1

| | | Example 1 | Example 2 | Example 3 | Comparative Example 1 | Comparative Example 2 | Comparative Example 3 | Comparative Example 4 |
|---|---|---|---|---|---|---|---|---|
| (A) Perfluoroelastomer | DAI-EL PERFLUORO GA-05, manufactured by Daikin Industries, Ltd. | 50 | 25 | 5 | 100 | 0.1 | 25 | — |
| (B) Fluorine rubber | VITON TR-8605, manufactured by DuPont | 50 | 75 | 95 | — | 99.9 | 75 | 100 |
| Crosslinking agent | PERHEXA 25B, manufactured by NOF Corporation | 1.0 | 1.0 | 1.0 | 1.0 | 1.0 | 1.0 | 1.0 |
| Co-crosslinking agent | TAIC, manufactured by Nippon Kasei Chemical Co., Ltd. | 1.0 | 1.0 | 1.0 | 1.0 | 1.0 | 1.0 | 1.0 |
| Rate of loss in weight by the exposure to plasma (weight %) | | 0.75 | 1.89 | 3.92 | 0.05 | 10.1 | 4.2 | 11.5 |
| Ordinary temperature characteristic | Tensile strength (MPa) | 9.04 | 6.48 | 10.3 | 4.36 | 5.03 | 4.23 | 4.86 |
| | Elongation at break (%) | 360 | 340 | 380 | 270 | 330 | 260 | 330 |
| | 100% stress (MPa) | 1.05 | 1.05 | 1.13 | 1.01 | 1.08 | 1.00 | 1.08 |
| Hot characteristic at 100° C. | Tensile strength (MPa) | 1.23 | 1.4 | 1.21 | 0.93 | — | 0.92 | 1.19 |
| | Elongation at break (%) | 132 | 140 | 111 | 110 | — | 105 | 108 |
| Average particle size of aggregate (μm) | | 0.8 | 1.3 | 0.5 | — | — | 20.5 | — |

TABLE 2

|  |  | Example 4 | Example 5 | Comparative Example 5 | Comparative Example 6 |
|---|---|---|---|---|---|
| (A) Perfluoroelastomer | DAI-EL PERFLUORO GA-05, manufactured by Daikin Industries, Ltd. | 50 | 75 | — | — |
| (B) Silicone rubber | KE-941-U, manufactured by Shin-Etsu Chemical Co., Ltd. | 50 | — | 100 | — |
| (B) Ethylene-propylene rubber | EP51, manufactured by JSR Corporation | — | 25 | — | 100 |
| Crosslinking agent | PERHEXA 25B, manufactured by NOF Corporation | 0.5 | 0.75 | — | — |
| Co-crosslinking agent | TAIC, manufactured by Nippon Kasei Chemical Co., Ltd. | 0.5 | 0.75 | — | — |
| Crosslinking agent | C8, manufactured by Shin-Etsu Chemical Co., Ltd. | 1.0 | — | 2.0 | — |
| Crosslinking agent | PERCUMYL D, manufactured by NOF Corporation | — | 0.25 | — | 1.0 |
| Rate of loss in weight by the exposure to plasma (weight %) |  | 0.64 | 2.50 | 1.80 | 61.2 |
| Ordinary temperature characteristic | Tensile strength (MPa) | 7.24 | 7.38 | 8.30 | 4.98 |
|  | Elongation at break (%) | 390 | 390 | 450 | 580 |
|  | 100% stress (MPa) | 0.96 | 1.11 | 0.89 | 1.14 |
| Hot characteristic at 100° C. | Tensile strength (MPa) | 2.41 | 1.64 | 2.62 | 1.57 |
|  | Elongation at break (%) | 210 | 200 | 250 | 160 |
| Average particle size of aggregate (μm) |  | 1.8 | 1.1 | — | — |

Furthermore, as is clear from FIGS. 2 to 4, the respective sheets of Examples 2 and 3 have a sea-island structure comprising a fine (not more than 2 μm) aggregate, whereas in the sheet of Comparative Example 3, a linear aggregate exceeding 10 μm is dispersed. Thus, it is noted that such a difference in the dispersion state is reflected in the measured values.

While the present invention has been described in detail and with reference to specific embodiments thereof, it will be apparent to one skilled in the art that various changes and modifications can be made therein without departing from the spirit and scope thereof.

This application is based on Japanese Patent Application Nos. 2004-378969 (filed Dec. 28, 2004) and 2005-330112 (filed Nov. 15, 2005), the contents thereof being herein incorporated by reference.

What is claimed is:

1. An elastomer composition comprising a mixture of (A) a perfluoroelastomer and (B) at least one elastomer selected from fluorine rubbers and ethylene-propylene based rubbers, in a mixing ratio (A/B) of from 0.5/99.5 to 80/20 in terms of weight ratio wherein the perfluoroelastomer (A) and the elastomer (B) form a sea-island structure in which one of the components (A) and (B) is dispersed as an aggregate having an average particle size of not more than 10 μm in the other component, wherein the perfluoroelastomer is a perfluoroelastomer containing copolymerization units of: a perfluoroolefin, a perfluorovinyl ether selected from the group consisting of a perfluoro(alkylvinyl)ether, a perfluoro(alkoxyvinyl)ether and a mixture thereof; and a curing site monomer.

2. The elastomer composition according to claim 1, wherein the mixing ratio (A/B) of the perfluoroelastomer (A) to the elastomer (B) is from 5/95 to 60/40 in terms of weight ratio.

3. The elastomer composition according to claim 1, further containing an organic peroxide and a co-crosslinking agent for crosslinking each of the perfluoroelastomer (A) and the elastomer (B) or crosslinking the former with the latter.

4. A molded body produced by molding the elastomer composition according to claim 1.

* * * * *